(12) United States Patent  (10) Patent No.: US 7,372,176 B2
Kneisel et al.  (45) Date of Patent: May 13, 2008

(54) BULKHEAD FLATWIRE INTEGRATION UNITS

(75) Inventors: Lawrence Kneisel, Novi, MI (US); Myron Lemecha, Dearborn, MI (US); Andrew Glovatsky, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 780 days.

(21) Appl. No.: 10/371,773

(22) Filed: Feb. 21, 2003

(65) Prior Publication Data

US 2004/0164620 A1  Aug. 26, 2004

(51) Int. Cl.
*H02B 1/20* (2006.01)
*H02B 1/04* (2006.01)
*H02B 1/26* (2006.01)
*H05K 5/03* (2006.01)
*H05K 1/09* (2006.01)
*H05K 1/11* (2006.01)
*H05K 1/14* (2006.01)
*B60L 1/00* (2006.01)
*H02G 3/02* (2006.01)

(52) U.S. Cl. ............... 307/9.1; 307/10.1; 361/601; 361/648; 361/658; 361/757

(58) Field of Classification Search .......... 307/91; 361/601, 637, 648, 658, 757
See application file for complete search history.

(56) References Cited

U.S. PATENT DOCUMENTS

| | | | | |
|---|---|---|---|---|
| 4,065,170 A | 12/1977 | Fabian et al. | ............ | 296/37.1 |
| 4,111,169 A * | 9/1978 | Lawrence | ............ | 123/702 |
| 4,152,021 A | 5/1979 | Götz et al. | ............ | 296/37.1 |
| 4,601,510 A | 7/1986 | Schöppel et al. | ............ | 296/194 |
| 4,710,419 A * | 12/1987 | Gregory | ............ | 428/210 |
| 5,371,324 A * | 12/1994 | Kanno et al. | ............ | 174/117 F |
| 5,417,471 A | 5/1995 | Kreis et al. | ............ | 296/194 |
| 5,671,802 A | 9/1997 | Rogers | ............ | 165/41 |
| 6,108,193 A | 8/2000 | Haberstroh | ............ | 361/600 |
| 6,186,106 B1 | 2/2001 | Glovatsky et al. | ............ | 123/143 |
| 6,272,016 B1 * | 8/2001 | Matonis et al. | ............ | 361/716 |
| 6,279,527 B1 | 8/2001 | Glovatsky et al. | ............ | 123/143 |
| 6,547,572 B1 * | 4/2003 | Burdick | ............ | 439/76.2 |
| 6,554,740 B2 * | 4/2003 | Kuehn et al. | ............ | 477/115 |
| 6,675,755 B2 * | 1/2004 | Glovatsky et al. | ............ | 123/143 C |
| 6,807,060 B2 * | 10/2004 | Glovatsky et al. | ............ | 361/707 |
| 6,823,244 B2 * | 11/2004 | Breed | ............ | 701/29 |
| 6,863,545 B2 * | 3/2005 | Peloza | ............ | 439/79 |
| 2004/0164589 A1 * | 8/2004 | Glovatsky et al. | ............ | 296/192 |
| 2004/0167294 A1 * | 8/2004 | Endou et al. | ............ | 525/342 |

FOREIGN PATENT DOCUMENTS

DE   4341355   6/1994
DE   19524165  8/1996

* cited by examiner

*Primary Examiner*—Michael Sherry
*Assistant Examiner*—Hal I. Kaplan
(74) *Attorney, Agent, or Firm*—Brinks Hofer Gilson & Lione

(57) ABSTRACT

The electronic system generally includes an electronic panel having circuitry plated on a surface thereof as well as electronic components attached thereto. The circuitry connects the electronic components for operation of the electronic device in the engine compartment. A flatwire bus electronically connects the electronic panel and the electronic device in the engine compartment for transmitting signals there between. The electronic panel is directly connected to the bulkhead.

19 Claims, 6 Drawing Sheets

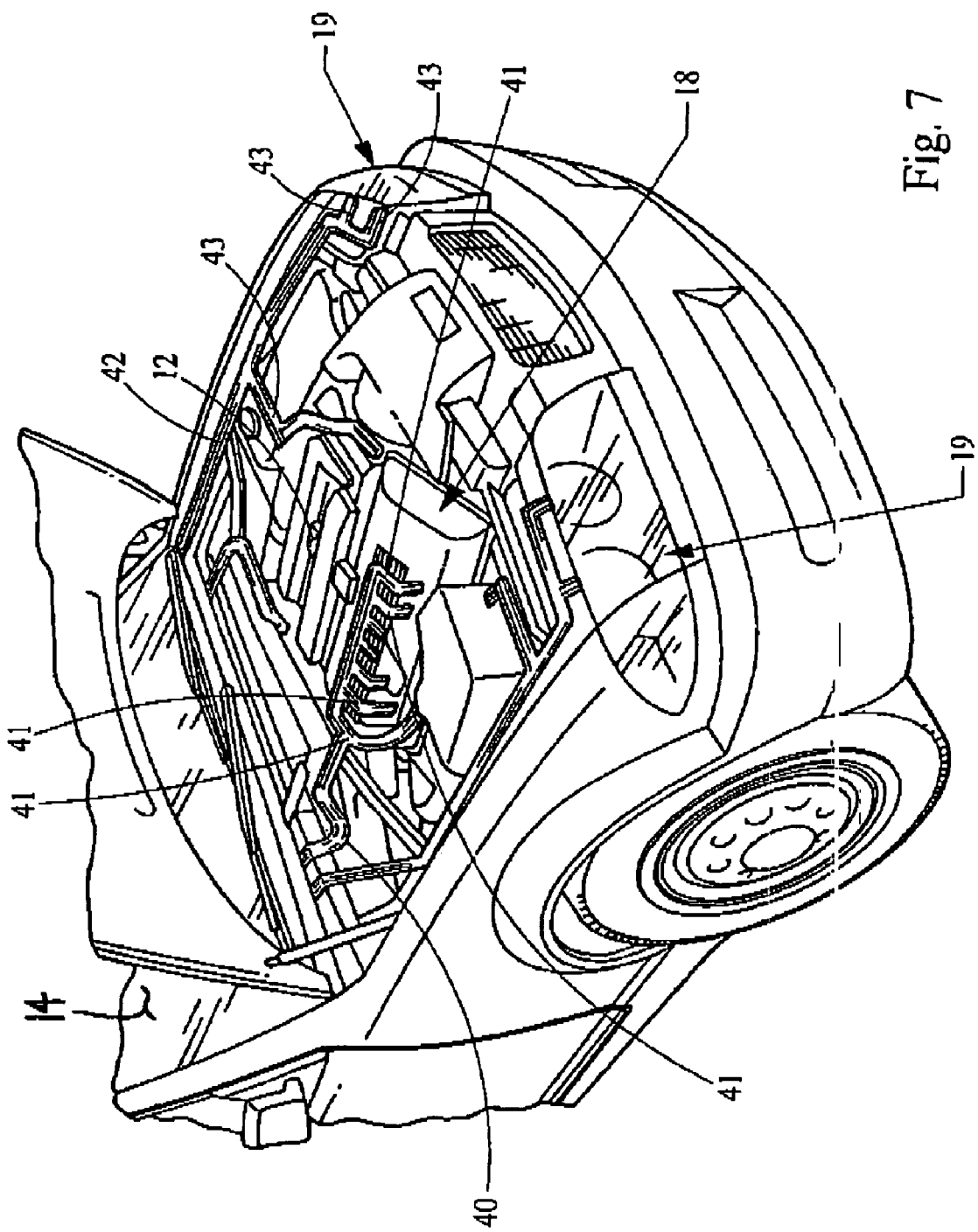

BULKHEAD FLATWIRE INTEGRATION UNITS

TECHNICAL FIELD

The present invention generally relates to underhood electronics in a motor vehicle, and more particularly relates to integration of these electronics.

BACKGROUND INFORMATION

Underhood electronics are becoming more prevalent as more functions are contained under hood, such as an antilock braking system, engine control, transmission control, and variable valve timing, as well as numerous sensors and actuators. Currently, heavily sealed modules are installed underhood which are used to house various electronic boxes. These modules are very costly due to the high level of sealing and protection required, as well as the need for cooling of the electronics. Typically these modules include aluminum cast housings with cooling features, as well as a significant amount of bracketry to support the electronic boxes in the entire module. Further, these modules require connectors, pigtails, and wiring harnesses that are associated with each of the underhood electronic devices. Accordingly, there exists a need to provide an electronic system for the underhood devices of a motor vehicle which reduces the costs, packaging, volume and weight of the system, while increasing the serviceablilty and packaging efficiency of the system.

BRIEF SUMMARY OF THE INVENTION

The present invention provides an electronic system for a motor vehicle having a bulkhead separating an engine compartment and a passenger compartment, the engine compartment having an electronic device for performing a vehicle function. The electronic system generally includes an electronic panel having circuitry plated on a surface thereof as well as electronic components attached thereto. The circuitry connects the electronic components for operation of the electronic device in the engine compartment. A flatwire bus electronically connects the electronic panel and the electronic device in the engine compartment for transmitting signals therebetween. The electronic panel is directly connected to the bulkhead.

The electronic panel may be mounted to either the passenger side or the engine side of the bulkhead. Preferably, the electronic panel is an enclosure having an interior and an exterior, wherein the electronic components and circuitry are formed on the interior of the electronic panel. Alternatively, the electronic components and the circuitry may be formed on the exterior of the electronic panel. The system may further include a cover connected to the bulkhead enclosing the electronic panel for environmental protection.

The bulkhead typically includes an aperture, and the electronic panel may engage the aperture for plugging the bulkhead to provide environmental protection to the passenger compartment The electronic panel can be linked to the electronic devices within the passenger compartment via the aperture. Preferably, the electronic panel is vertically mounted such that the electronic components are vertically spaced. In that way, the hotter components may be mounted on a lower half of the electronic panel, or more specifically, the holler components may be mounted vertically below the cooler components. Additional electronic panels may be employed and attached to the bulkhead, as numerous electronic devices within the engine compartment may be controlled by the integrated system.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 7 is a perspective view of a motor vehicle having the electronic system of the present invention.

DETAILED DESCRIPTION OF THE INVENTION

Figure 1:
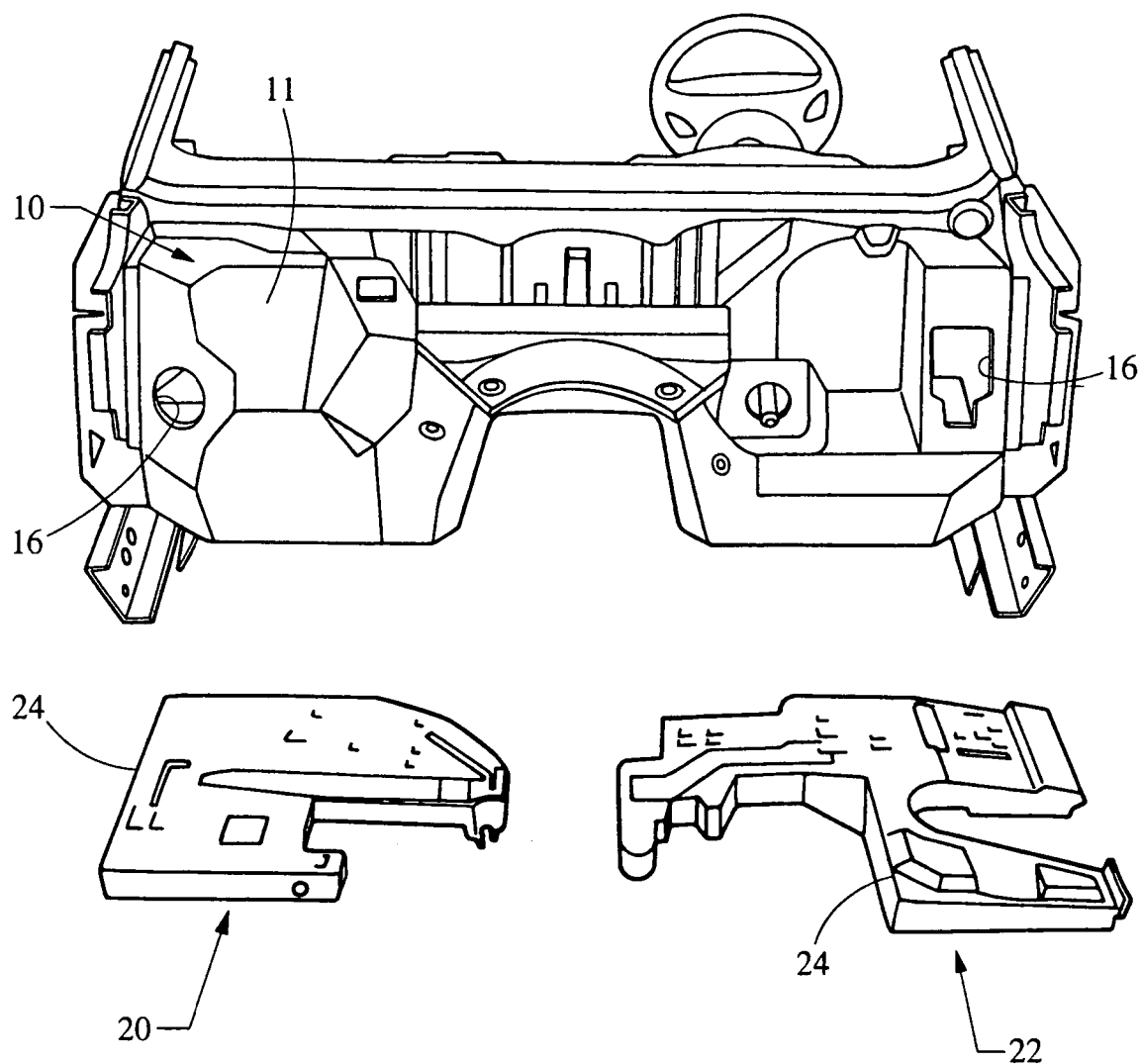
FIG. 1 is an exploded front perspective view of a vehicle bulkhead and the electronic panels forming a portion of the electronic system constructed in accordance with the teachings of the present invention.

Turning now to the figures, FIG. 1 depicts a first electronic panel 20 and a second electronic panel 22 for attachment to a vehicle bulkhead 10. The bulkhead is typically constructed of sheet metal for providing a barrier between an engine compartment 12 (FIG. 7) and a passenger compartment 14 (FIG. 7). The invention consolidates standard underhood electronic systems into one, or as shown, two large electronic panels, where all underhood electronics are located. The electronics are then interfaced to all of the electronic devices in the engine compartment, including sensors and actuators, via flatwire busses and flatwire take-outs from the electronic panels.

Accordingly, the electronic system of the present invention reduces the volume used to package underhood electronics, as well as reduces the weight and cost by eliminating large wire harnesses, module housings, bracketry, and standard connector systems. Additionally, the use of one or two electronic panels provides easier serviceability of the electronic system. Finally, the vehicle bulkhead may include large apertures which are sized to receive the electronic panels. In this way, the analogous section of metal of the bulkhead may be replaced with the preferred plastic material of the module, which is much lighter, while still providing the necessary mechanical and environmental protection between the engine compartment and the passenger compartment.

Figure 2:
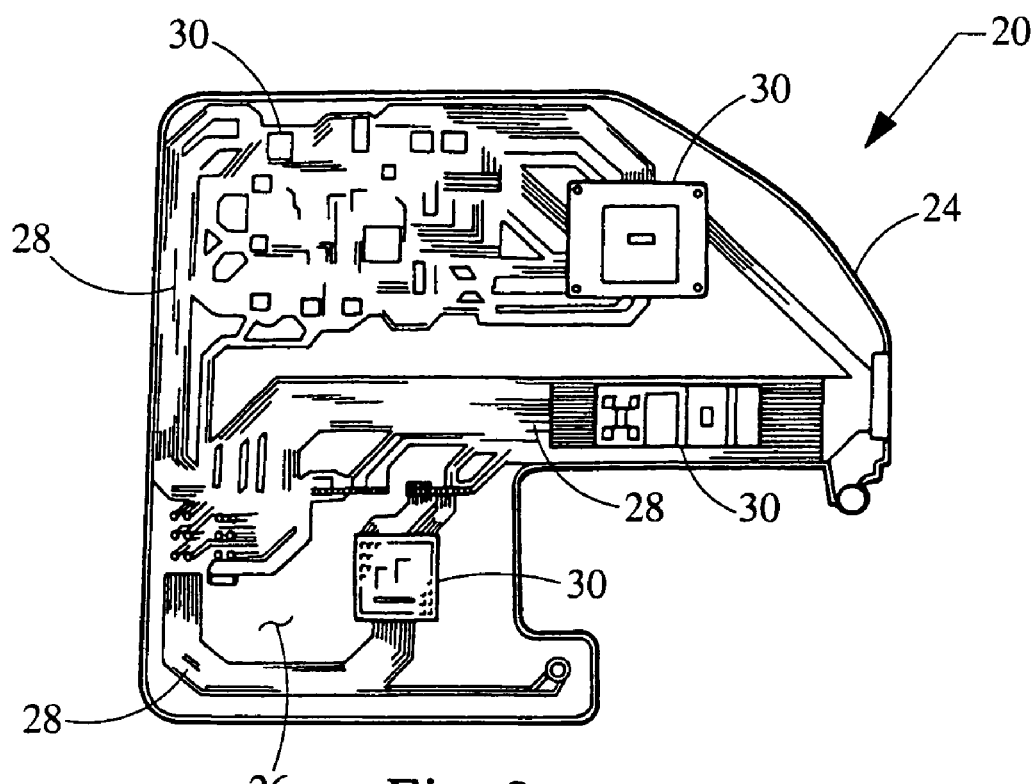
FIG. 2 is a plan view of a first electronic panel of the electronic system.
Figure 3:
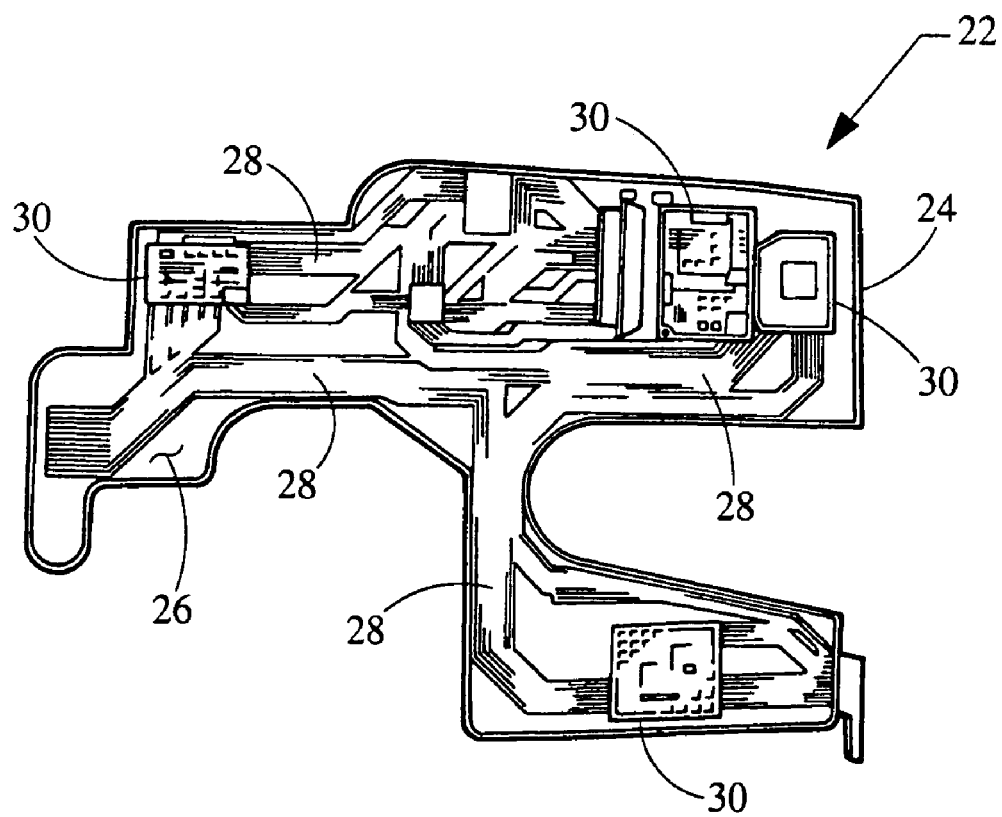
FIG. 3 is a plan view of a second electronic panel of the electronic system.

As shown in FIGS. 2 and 3, the electronic panels each include a substrate 24, preferably constructed of a polymer or plastic. The substrate 24 may be molded and may be formed into many different shapes or configurations as shown in the figures. The substrate 24 defines an outer surface 26 which has circuitry 28 plated on that surface of the substrate 24. The circuitry 28 interconnects various electronic components 30 which are designed for operation of the electronic device in the engine compartment 12. Such electronic devices include anti-lock braking systems, engine control units, transmission control units, and valve timing, as well as numerous sensors and actuators. The electronic panels may contain all the electronics to operate electronic devices within the passenger compartment 14 as well, such as amplifiers, airbags, audio/radio, or global positioning systems and the like.

Turning back to FIG. 1, the plastic substrate 24 of the electronic panels 20, 22 can be formed into an enclosure having an interior and an exterior Accordingly, it will be recognized by those skilled in the art that the circuitry 28 end the electronic components 30 may be located on the interior of the panels 20, 22 and more specifically, the enclosure formed by the plastic substrate 24. This will provide for added environmental protection for the circuitry 28 and the electronic components 30, ensuring reliable operability. As shown in the figures, the circuitry is plated on the plastic substrate 24 and the electronic components 26 are mounted to the outer surface 26 of the panels 20, 22.

When the circuitry 28 and electronic components 30 are formed on the outer surface 26 of the electronic panels 20, 22, additional protection can be added. This protection can be a conformal coating, or it can take the form of a cover, which can be constructed of plastic, or metal or a hybrid composition including metalized films. These covers or coatings can provide additional environmental protection as well as electromagnetic interference EMI shielding.

Figure 4:
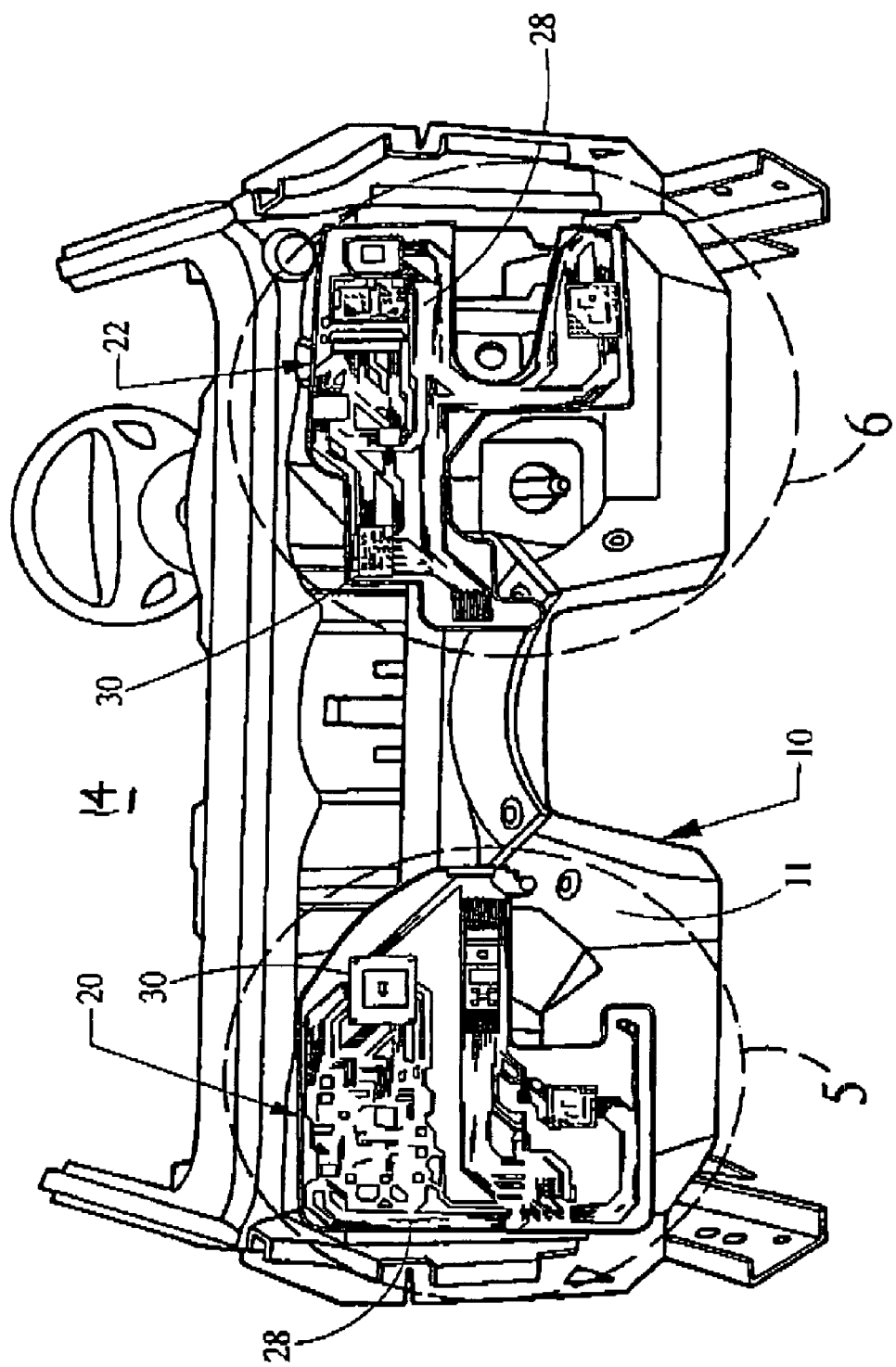
FIG. 4 is a front view showing the electronic panels attached to the bulkhead.

As shown in FIG. 4, the electronic panels 20, 22 are attached directly to the vehicle bulkhead 10, and more specifically the engine side 11 of the bulkhead 10. Accordingly, the bulkhead provides structural support as well as thermal heat sinking to the circuitry 28 and electronic components 30.

The electronic panels 20, 22 also provide a secondary structural benefit. As shown in FIG. 1, the vehicle bulkhead 10 can include various apertures 16 which provide pass-through opportunities. Accordingly, the electronic panels 20, 22 preferably engage these apertures 16 and operate as bulkhead plugs or dash panel inserts to provide additional mechanical support to the sheet metal used in the bulkhead 10. As a dash panel insert, the electronics can easily interface with the cockpit system or house much of the cockpit electronics to improve design freedom in the interior passenger compartment 14.

Figure 5:
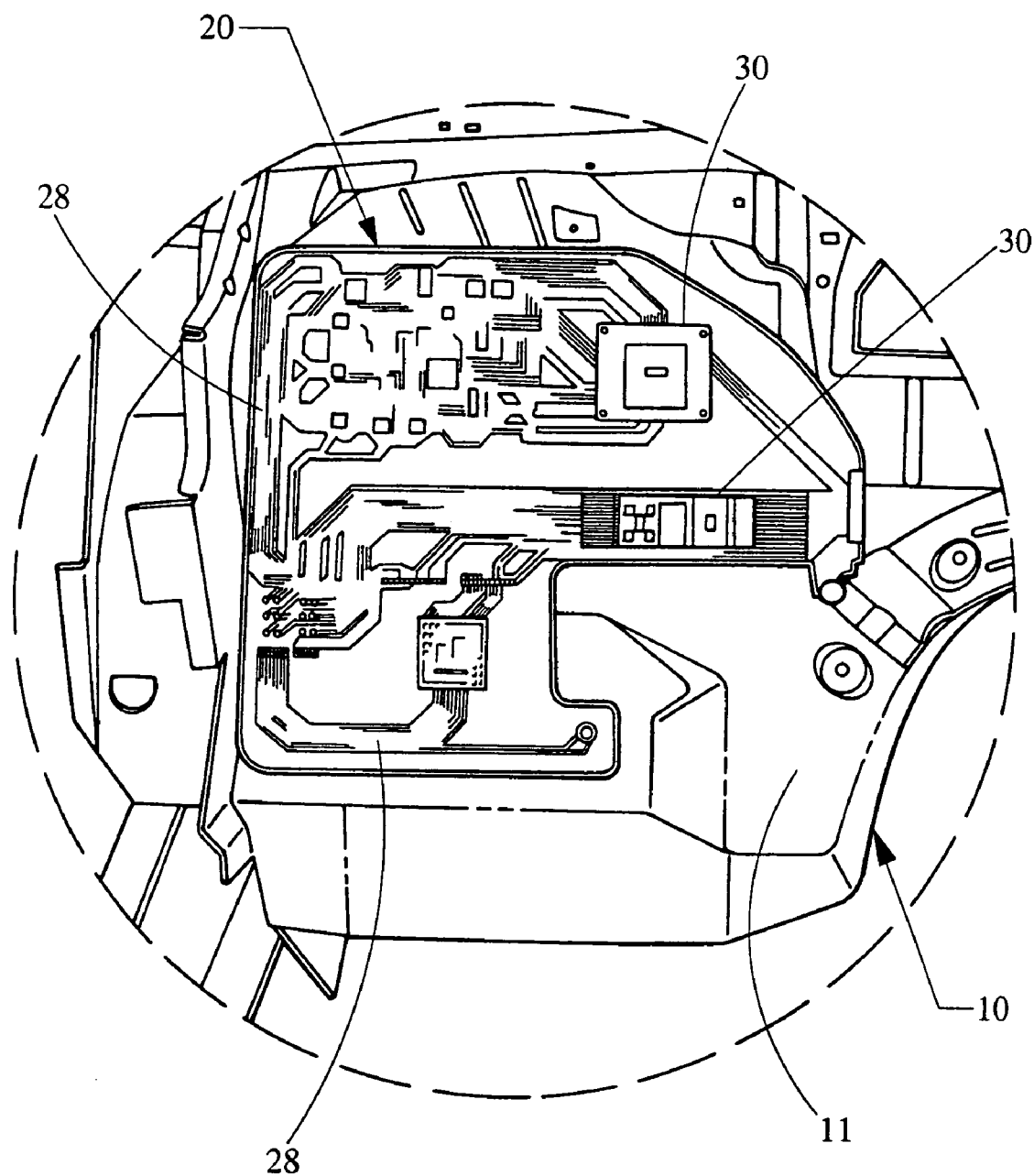
FIG. 5 is an exploded view, partially cut away, taker about the dashed circle 5 in FIG. 4.
Figure 6:
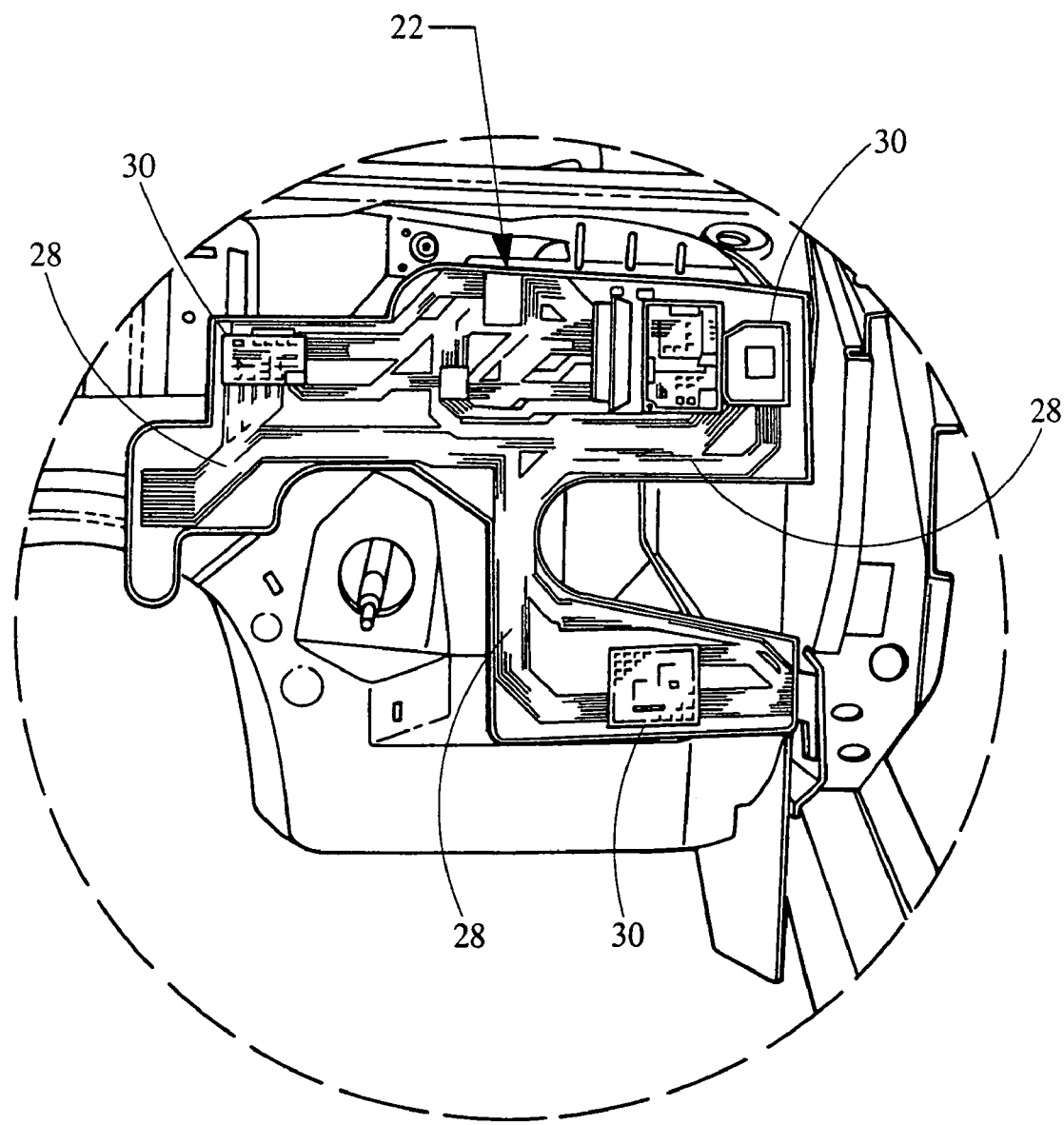
FIG. 6 is an exploded view taken about the dashed circle 6 of FIG. 4.

The electronic panels, 20, 22 are designed to engage the bulkhead 10 and still provide pass-throughs as needed for the tubing or other items, i.e., for the heating and ventilation air conditioning (HVAC) system. These features are shown in the enlarged views of FIGS. 5 and 6 depicting the panels 20, 22 attached to the bulkhead while still providing pass-throughs through the bulkhead 10.

The electronic panels 20, 22 can be constructed of a metal such as cast aluminum, steel, magnesium or various alloys. These panels 20, 22 may also be constructed of a filled plastic such as acrylonitrite butadiene styrene ABS, nylon, polybutylene terephthalate (PBT) or ultem. A composite structure may also be employed such as epoxy-carbon fiber, or overmolded steel structures. The circuitry 28 can be applied to the interior or exterior of the panels 20, 22 through numerous methods such as plating, bonding, etching, or in-molding. It will also be recognized that a flat flexible circuit can also provide the necessary circuitry 28 to the panel 20, 22, which can be attached to the substrate 24 by way of mechanical connectors such as pins, clips, Velcro and the like, as well as by adhesive connection preferably utilizing a thermally conductive adhesive.

As illustrated in FIG. 7, the electronic panels 20, 22 (FIG. 4) may be electronically connected to the electronic devices within the engine compartment 12 by way of a flatwire bus system which can include flatwire takeouts. As depicted, a first flatwire bus 40 extends from the first electronic panel 20 through an aperture 16 (FIG. 1), and has numerous flatwire takeouts 41 which are connected to a device such as the injectors and ignition coils on the engine 18 in the engine compartment 12. A second flatwire bus 42 extends from the second electronic panel 22 and includes flatwire takeouts 43 connected to a lighting system 19, and more particularly to the front lights of the vehicle.

The flatwire busses and pickups can be mechanically and metallurgically connected directly to the circuitry on the electronic panels 20, 22. Alternatively, the use of flatwire connectors allows for simple servicing of each modular unit, and these connectors may also be used. The flatwire bus system 40, 42 as well as the takeouts 41, 43 may be attached directly to underhood structures where available, and alternately may be supported by a thin plastic sheet mounted to it. The sheet can be flexible or pre-formed to route the flatwire as desired. The flatwire bus can also be coated with silicone or nylon, or overmolded with a material such nylon, polystyrene, ABS-polycarbonate, to provide added protection within the engine compartment 12.

It is intended that the foregoing detailed description be regarded as illustrative rather than limiting, and that it be understood that it is the following claims, including all equivalents, that are intended to define the spirit and scope of this invention.

The invention claimed is:

1. An electronic system for a motor vehicle having a bulkhead separating an engine compartment and a passenger compartment, the bulkhead having an engine side and a passenger side and an aperture, the engine compartment having an electronic device for performing a vehicle function, the electronic system comprising:
   an electronic panel having circuitry plated on a surface thereof and electronic components attached thereto, the circuitry connecting the electronic components for operation of the electronic device in the engine compartment;
   a flatwire bus electronically connected to the electronic panel and the electronic device in the engine compartment for transmitting signals therebetween; and
   the electronic panel farming an enclosure having an interior and an exterior, the electronic panel being connected directly to the bulkhead and closing off the aperture and plugging the bulkhead to provide environmental protection to the passenger compartment.

2. The electronic system of claim 1, wherein the electronic panel is mounted to the passenger side of the bulkhead.

3. The electronic system of claim 1, wherein the electronic panel is mounted to the engine side of the bulkhead.

4. The electronic system of claim 1, wherein the electronic components are located on the interior of the electronic panel.

5. The electronic system of claim 1, wherein the circuitry is plated on the interior of the electronic panel.

6. The electronic system of claim 1, wherein the electronic components are located on the exterior of the electronic panel.

7. The electronic system of claim 1, wherein the circuitry is plated on the exterior of the electronic panel.

8. The electronic system of claim 1, wherein the circuitry and electronic components of the electronic panel are coated with a conformal coating for environmental protection.

9. The electronic system of claim 1, further comprising a cover connected to the bulkhead and enclosing the electronic panel for environmental protection.

10. The electronic system of claim 1, wherein the electronic panel is constructed of a polymeric material.

11. The electronic system of claim 1, wherein the electronic panel is linked to electronic devices within the passenger compartment via the aperture.

12. The electronic system of claim 1, wherein the flatwire bus extends through the aperture.

13. An electronic system for a motor vehicle having a bulkhead separating an engine compartment and a passenger compartment, the bulkhead having en engine side and a passenger side, the engine compartment having an electronic device for performing a vehicle function, the electronic system comprising:

an electronic panel having circuitry attached to a surface thereof and electronic components attached thereto, the circuitry connecting the electronic components for operation of the electronic device in the engine compartment;

a flatwire bus electronically connected to the electronic panel and the electronic device in the engine compartment for transmitting signals therebetween; and the electronic panel being connected directly to the bulkhead and vertically mounted such that the electronic components are vertically spaced, the electronic components including hotter components and cooler components, the hotter components being mounted vertically below the cooler components.

14. The electronic system of claim 1, the motor vehicle including a second electronic device located in the engine compartment, further comprising a second flatwire bus linking the electronic panel to the second electronic device.

15. An electronic system for a motor vehicle having a bulkhead separating an engine compartment and a passenger compartment, the bulkhead having an engine side and a passenger side, the engine compartment having an electronic device for performing a vehicle function, the electronic system comprising:

an electronic panel comprising an enclosure having an interior and an exterior surface, the electronic panel having circuitry plated on one of the interior or exterior surfaces and electronic components attached to the interior surface, the circuitry connecting the electronic components for operation of the electronic device in the engine compartment the electronic components being vertically spaced and including hotter components and cooler components, the hotter components being mounted vertically below the cooler components;

a flatwire bus electronically connected to the electronic panel and the electronic device in the engine compartment for transmitting signals therebetween; and the electronic panel being mounted to the engine side of the bulkhead.

16. An electronic system for a motor vehicle having a bulkhead separating an engine compartment and a passenger compartment, the bulkhead having an engine side and a passenger side, the engine compartment having an electronic device for performing a vehicle function, the electronic system comprising:

an electronic panel having circuitry plated on a surface thereof and electronic components attached thereto, the circuitry connecting the electronic components for operation of the electronic device in the engine compartment, the electronic components including hotter components, the hotter components being mounted on a lower half of the electronic panel;

a flatwire bus electronically connected to the electronic panel and the electronic device in the engine compartment for transmitting signals therebetween; and the electronic panel being connected directly to the bulkhead, the bulkhead defining an aperture and the electronic panel closing off the aperture and plugging the bulkhead to provide environmental protection to the passenger compartment.

17. The electronic system of claim 15, wherein the circuitry is plated on the interior of the electronic panel.

18. The electronic component of claim 13, wherein the bulkhead has an aperture, the electronic panel closing off the aperture and plugging the bulkhead to provide environmental protection to the passenger compartment.

19. The electronic component of claim 16, wherein the flatwire bus extends through the aperture.

* * * * *

UNITED STATES PATENT AND TRADEMARK OFFICE
CERTIFICATE OF CORRECTION

PATENT NO.       : 7,372,176 B2
APPLICATION NO.  : 10/371773
DATED            : May 13, 2008
INVENTOR(S)      : Lawrence Kneisel et al.

It is certified that error appears in the above-identified patent and that said Letters Patent is hereby corrected as shown below:

In the Claims

Column 4, in claim 1, line 15, after "electronic panel" delete "farming" and substitute --forming-- in its place.

Column 5, in claim 13, line 3, after "bulkhead having" delete "en" and substitute --an-- in its place.

Signed and Sealed this

Twenty-eighth Day of October, 2008

JON W. DUDAS
*Director of the United States Patent and Trademark Office*